Sept. 2, 1924.

C. F. McBEE 1,507,025

INDEX BOOK FOR FILING SYSTEMS

Filed Nov. 17, 1921

Fig. 1.

| No. | Name |
|---|---|
| 918F | BALLARD & THOMPSON R.R. |
| 1076F | BALTIMORE & CAROLINA S.S. CO. |
| 38F | BALTIMORE & OHIO R.R. |
| 38F | BALTIMORE & OHIO SOUTHWESTERN R.R. |
| 41F | BALTIMORE & OHIO CHICAGO TERMINAL R.R. |
| 1011F | BALTIMORE & PHILADELPHIA STEAMBOAT CO. |
| 24F | BALTIMORE & SPARROWS POINT R.R. (PENNA SYSTEM) |
| 180F | BALTIMORE, CHESAPEAKE & ATLANTIC RY. |
| 1056F | BALTIMORE-NORFOLK ROUTE |
| 1056F | BALTIMORE-RICHMOND ROUTE |
| 1078F | BALTIMORE STEAM PACKET CO. |
| 516F | BAMBERG, EHRHARDT & WATERBORO RY. |
| 923F | BAMBERGER ELECTRIC R.R. |
| 454F | BANGOR & AROOSTOOK R.R. |
| 1073F | BARE ROCK R.R. |
| 674F | BARNEGAT R.R. |
| 11F | BARRE & CHELSEA R.R. |
| 1008F | BARTLETT WESTERN RY. |
| 568F | BATESVILLE SOUTHWESTERN R.R. |
| 23F | BATH & HAMMONDSPORT R.R. |
| 857F | BAUXITE & NORTHERN RY. |
| 1078F | BAY LINE |
| 1080F | BAYONNE & NEWHAVEN TRANSPORTATION CO. |
| 945F | BAY POINT & CLAYTON R.R. |
| 1047F | BAY STATE LINE |
| 419F | BAY TERMINAL R.R. |

Tabs: B, Be, Bo, Bu, C, Can, Car, Ce, Ch, Chi, Chi M, Ci, Co, Cr, D, Det, E, Em, F, Fo

Fig. 2.

No. — SUBJECT — SUFFIX WITH

| No. | Subject | Page |
|---|---|---|
| 979 | SELLING all TICKETS possible to avoid cash fares — Station No. | |
| 785 | SELLING PULLMAN space beyond destination of rail ticket — Station No. | |
| 420 | SENIORITY- EMPLOYEES seniority lists | |
| 20 | SEPARATION and CONSOLIDATION of accounts | |
| 699 | SERVICE-APPORTIONMENT of operating expenses to freight and passenger service | 128 |
| 1021 | CHANGES in Train Service | 129 |
| 781 | COMPLAINTS on pullman service | 130 |
| 961 | Cost of telegraph service | 131 |
| 1020 | FREIGHT Train Service | 132 |
| 908 | INADEQUATE Station Serice | 133 |
| 282 | INVESTIGATION on water service | 134 |
| 1023 | Joint train service | 135 |
| 704 | LOCOMOTIVE and train service operation | 136 |
| 1019 | PASSENGER Train Service | 137 |
| 293 | PUBLIC Service Commission | 138 |
| 64 | RAILROAD Refrigerator Service Association | 139 |
| 840 | REPORTING revenue on special service trains | 140 |
| 297 | REPORTS to Public Service Commissions, covering application of proceeds of bonds | 141, 142 |
| 964 | TELEPHONE Service | 143 |
| 975 | TICKET sellers Knowledge of routes Station No. | 144 |

Fig. 3.

Abandoned -1, Appropriations-9, Basis-14
Absence -1, Approval-10, Berth-14
Absorbed -1, Arbitrary-10, Betterments-14
Absorption-1, Arbitration-10, Bills-15-16
Abstracts -1, Arrangements-10, Bills of Lading
Accepting-1, Arrests-10, Billing 39
Accidents -1, Arrival-10, Binders Meeting-39
Accountants-1, Articles-10, Assignee 39
Accounting-12, Assessments, Consists- 39
Accounts-3-4, Assets 30, Consolidate -39
Capital, Crossing-31, Construction-39
Card-19, Clubs-31, Continental-39
Cars-19-20-21-22, Coaches- 31, Contingent -39
Caretakers-22, Coal-31, Contractors-39
Car-load -22, Codes-31, Contracts -39-40
Carried-22, Coke -31, Contribution-40
Carriers-22, Collected-31, Control -40
Carrying-22, Collectible-31, Controversies 40
Cases-22, Collections-31, Corn- 40
Cash-23-24, Collectors-33, Corporate -40
Certificate-24, Commercial-33, Corporation-40-41
Central-24, Commissions 33, Correct 41
Census-24, Committee-33, Corrections-41
Seniority -128, Stencil-138-41-42, Correspondence-41
Separation 128, Stock -138
Service -128-129, Stockholders-138
Services-129, Storage-138-139
Settlement 129, Stores -139
Settlements-129, Structure -139
Sheds -129, Subsidiary-139
Shipments 129-130, Summary -139
Shipped -130, Superintendence-139
Shippers-130, Supervision-139
Shop-130, Supervisor -139
Short-130, Supplies - 139
Shortage-130, Surcharge-140
Sickness -131, Surrender -140
Side -131

Tabs: A, B, C, D, E, F, G, H, I, J, K, L, M, N, O, P, Q, R, S, T, U, V, W, X, Y, Z Inventor:
Chas. F. McBee
by Dodson & Roe Attys Patented Sept. 2, 1924.

1,507,025

UNITED STATES PATENT OFFICE.

CHARLES F. McBEE, OF ATHENS, OHIO, ASSIGNOR TO THE McBEE BINDER COMPANY, OF ATHENS, OHIO.

INDEX BOOK FOR FILING SYSTEMS.

Application filed November 17, 1921. Serial No. 515,818.

*To all whom it may concern:*

Be it known that I, CHARLES F. McBEE, a citizen of the United States, residing at Athens, in the county of Athens and State of Ohio, have invented a new and useful Index Book for Filing Systems, of which the following is a specification.

My invention relates to filing systems of the class disclosed and claimed in my application for Patent No. 501,382, filed in the United States Patent Office on the 17th day of Sept., 1921, and has for its object to provide such an improvement for the invention therein disclosed as to make it possible for a person to quickly and accurately locate the subject matter of correspondence, on which he is working, so as to characterize it by proper reference numerals, which are placed in appropriate manner on the correspondence letter, thereby functioning, additionally, as a help and a time saver in the receiving office.

A further object is to stabilize my system, as disclosed in the aforesaid invention, so as to bring uniformity and accuracy into all the allied offices utilizing my invention.

It will be noted, by reference to the aforesaid application for patent, that it embodies a co-related listing of transportation systems and general subject matters pertaining thereto which might be the subject of any correspondence between them, or with any others with relation to such subject matters. My present invention is directed to bringing to that system a careful listing of all keywords, with reference characters therefor, which will enable any person to quickly and accurately select the proper subject in its relation to the correspondence under consideration, and by reference to the listing of the subject matter as disclosed by the keyword, enable him to place on the correspondence the proper reference character designating its co-related subject matter.

My invention, and its adaptation as an improvement to my aforesaid invention, will be more readily understood by reference to the accompanying drawing taken in connection with this specification and the appended claims.

In the drawings, Figure I shows a portion of a book disclosing a page containing listings of transportation lines;

Figure II is a similar view, the page disclosing a listing of subjects; and

Figure III is a similar view, the page disclosing a listing of keywords with their reference numerals in juxtaposition therewith.

Referring to the accompanying drawing the reference numeral 10 is used to indicate a book, the body portion of which is made up of three groups of leaves, the group 11 containing the names of all the transportation lines, preferably arranged alphabetically, each provided with its identifying numeral 12; the group 13 containing a listing of all subjects, preferably arranged alphabetically, each with its identifying numeral 14; and the group 15 containing a carefully selected listing of keywords, preferably arranged alphabetically, with their identifying numerals 16 which enables a person to immediately turn to the page of the book on which appear all subjects containing that keyword.

The pages of the three groups of leaves are preferably defined by projecting tabs with proper reference characteristics, the keyword group having tabs with letters alphabetically arranged to provide quick reference for locating a selected keyword, the subject group being defined by tabs with numerals to designate the number of the page in its relation to the identifying characteristics defining the keywords, and the group of transportation lines being defined by tabs with letters corresponding to the alphabetical arrangement of the lines.

In practical operation we will assume a bureau of the Baltimore and Ohio Railway is writing to the Bath and Hammondsport Railway relative to separation and consolidation of accounts. 38 is known by the writer to be the number of his own road; 20 is found to be the number of the subject, and 23 is found to be the number of the road he is writing to. These file numbers are placed upon the letter and appear as follows: (38) 20—23.

This communication, bearing the identifying numerals as stated, is filed in the forwarding office under 20—23, and in the receiving office under 20—38. In replying, the arrangement of the numerals appearing on the letter would be reversed and read: (23) 20—38.

The group of keyword leaves is designed to contain all keywords which would ordinarily occur to a person engaging in the correspondence. For instance, it will be noted in the drawing that the keyword "Separation" appears in its proper place in the alphabetical arrangement of keywords. And at each place it is disclosed it refers the operator to a certain page of the subject listings and, while these pages are different for each work yet by referring to the page indicated it will be found that the subject on each of these pages, under each of the words given, will have its proper identifying characteristic which, in this particular instance, is the reference character 20. This will be disclosed by reference to Figure 2 which shows page 128 (being the page referred to by the word "Separation" in the keywords) and it will be noted the reference character for "separation and consolidation of accounts" is 20. All other subjects are treated in the same manner and thus it is obvious the keyword group of leaves enables a correspondent to quickly and accurately locate any subject in the subject list and learn its proper reference characteristic.

For convenience I have described my invention as it is used in the offices of transportation lines, but it can be applied with equal force and utility to any other branches of industry, and I do not wish to be understood as limiting my invention to any particular class.

Having thus described my invention what I claim and desire to secure by Letters Patent of the United States is:

1. An index book for filing systems comprising the embodiment of a group of leaves containing a classified list of allied industries, and an identifying character for each of same with a classified list of subjects pertaining to possible correspondence matters, and an identifying character for each subject with a classified list of keywords pertaining to the subjects and an identifying character for each of the same, referring the operator to the page of the book on which the particular subject is listed.

2. An index book for filing systems comprising the embodiment of a group of leaves containing an alphabetically arranged list of allied industries and a reference character for each of the same with a second group of leaves containing an alphabetically arranged list of subjects pertaining to said industries and a reference character for each subject with a third group of leaves containing an alphabetically arranged list of keywords pertaining to said subjects with a reference character for each keyword, referring the operator to the page of the book on which the particular subject is listed.

3. An index book for filing systems comprising the embodiment of a list of industries arranged for convenient reference and an identifying character for each industry with a list of subjects, applying to the industries, arranged for convenient reference and an identifying character for each subject with a list of keywords, applying to said subjects, arranged for convenient reference and an indentifying character for each keyword, referring the operator to the page of the book on which the particular subject is listed.

CHARLES F. McBEE.

Witnesses:
CARL E. CAMERON,
H. C. CAMERON.